Feb. 3, 1959          H. J. GERSTNER          2,871,717

STEERING MECHANISM AND CONTROL MEANS FOR OUTBOARD MOTORS

Filed April 5, 1957          2 Sheets-Sheet 1

INVENTOR.
HARVARD J. GERSTNER
BY
John L. Woodward
ATTORNEY

Feb. 3, 1959    H. J. GERSTNER    2,871,717
STEERING MECHANISM AND CONTROL MEANS FOR OUTBOARD MOTORS
Filed April 5, 1957    2 Sheets-Sheet 2

INVENTOR.
HARVARD J. GERSTNER
BY
John L. Woodward
ATTORNEY

United States Patent Office 2,871,717
Patented Feb. 3, 1959

2,871,717

STEERING MECHANISM AND CONTROL MEANS FOR OUTBOARD MOTORS

Harvard J. Gerstner, Minneapolis, Minn.

Application April 5, 1957, Serial No. 650,987

3 Claims. (Cl. 74—484)

This invention relates to a steering mechanism and control means for the gear shift control and throttle control of outboard motors.

The device consists of a unitary structure which is readily adapted to be mounted on the forward bulkhead of a boat.

The device comprises a bracket mounted on the rear of the bulkhead and a support assembly adapted to be mounted adjacent the front of the bulkhead. A steering post provided with a steering wheel extends through the bracket and support assembly. Steering drums are mounted on the lower end of the steering post. A gear shaft provided with a handle at its upper end adjacent the steering wheel extends in a plane parallel to the steering post, through the bracket and into the support assembly. A throttle shaft provided with a handle at its upper end adjacent the steering wheel extends in a plane parallel to the steering post through the bracket, bulkhead and into the support assembly. A bracket of the support assembly carries two rod or tubular members. A plug means is mounted for back and forth movements on each of the rod members. A crank arm on the lower end of the gear shaft is connected to the movable plug on one of the tubular members and a crank arm on the lower end of the throttle shaft is connected to the movable plug on the other of the rod members.

It is the primary object of this invention to provide a novel remote control assembly whereby the operator of the boat from one position may readily steer the boat, control the operation of the throttle of an outboard motor as well as control the shifting of the gears to effect forward, neutral and reverse operation of the motor.

Another object of this invention is to provide in a remote steering mechanism and control means for an outboard motor, the positioning of all of the handles for the steering and control means within easy reach of the operator.

It is another object of this invention to provide in a remote control steering mechanism and control means for the control of the operation of an outboard motor, a unitary structure which is easily mounted on a boat.

It is still another object of this invention to provide in a remote steering and control mechanism for a power boat and its outboard motor of means which provides ease and safety in operation.

Other and further objects of the invention will appear from the detailed description of the device and the appended claims.

Figure 1:
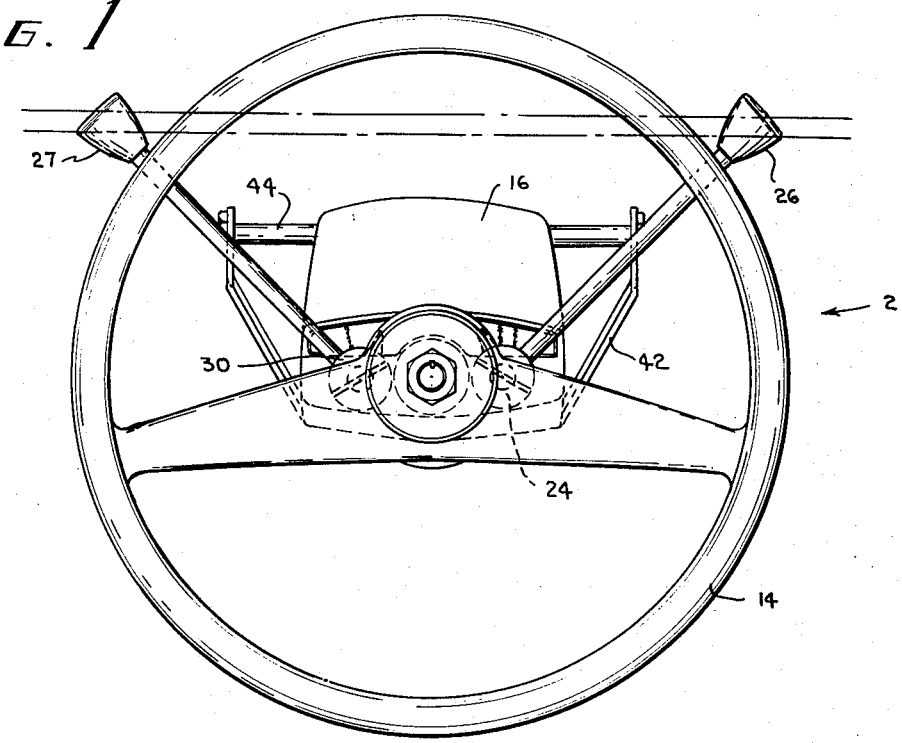
Figure 1 is a top plan view of the steering and control means for a power boat.
Figure 5:
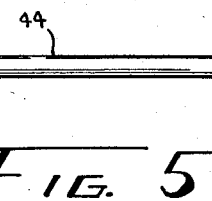
Figure 5 is a front view of one of the rod members for the support assembly.
Figure 3:
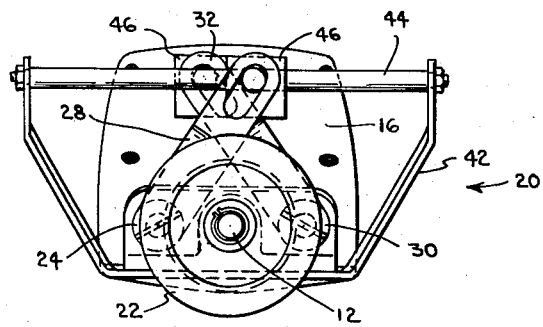
Figure 3 is a view of the lower end of the steering and control means.

Referring in detail to the drawings, 10 is the steering mechanism and control means for an outboard motor. The steering mechanism comprises a solid steering post 12 provided with a steering wheel 14 which is appropriately fastened to the upper end of the post 12. The steering post 12 extends through a hole in the central portion of a bracket 16. A pair of steering drums 22 are secured on the lower end of the steering post 12.

A gear shaft 24 extends in a plane parallel with the steering post 12 through a hole in the bracket 16. A gear shift handle 26 is connected to the upper end of the gear shaft 24 adjacent the steering wheel 14. A crank arm 28 is fixedly mounted on the lower end of the gear shaft 24.

A throttle shaft 30 extends in a plane parallel with the steering post 12 through a hole in the bracket 16. A crank arm 32 is connected adjacent the lower end of the throttle shaft 30.

The bracket 16 is secured by bolts 13 to the front side of the mounting board 18 at the front of a boat.

Figure 2:
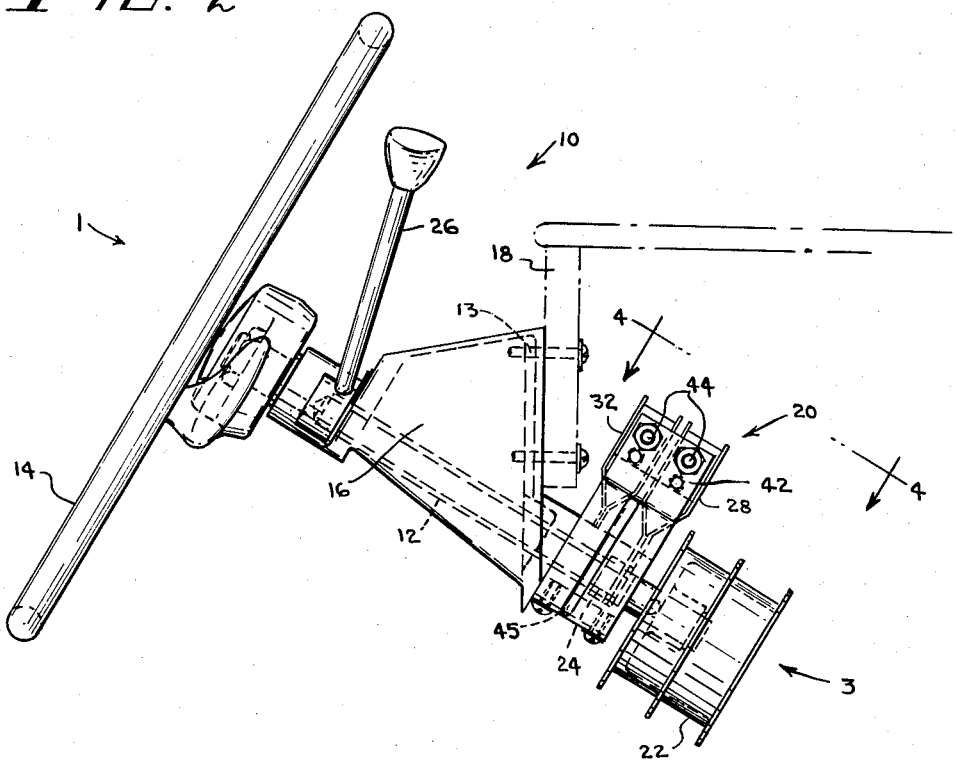
Figure 2 is view in side elevation of the steering and control means.
Figure 4:
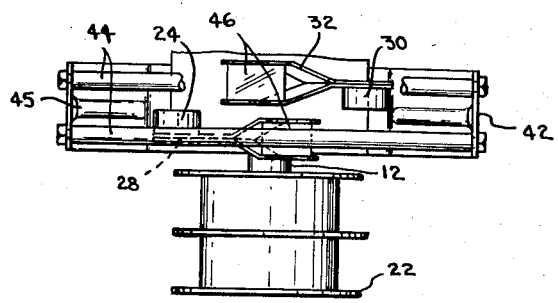
Figure 4 is a view taken on lines 4—4 of Figure 2 disclosing a portion of the support assembly on the lower end of the mechanism.

The central portion of a bracket 42 is secured by screws 45 to an extension on the bottom edge of the bracket 16. Both ends of the bracket 42 are bent upwardly from its central portion and are provided with spaced apart holes. A pair of rod members 44 are secured by nuts to the bracket 42. A plug 46 is slidably mounted on each of the rod members 44. Crank arm 28 of the gear shaft 24 is connected to the plug 46 on the lower rod member 44, see Figure 2. The crank arm 32 on the throttle shaft 30 is connected to the plug 46 on the upper rod member 44.

A rope cable (not shown) is adapted to extend to and be releasably connected to one end of the plug 46 on the lower rod members 44. A rope cable extends to and is releasably connected to the opposite end of the plug 46 mounted on the upper rod member 44. The cable may extend to and be connected to either one end or the other end of the slidable plugs 46. The cables connected to the plugs 46 on the rod members 44 extends to the gear shift lever of an outboard motor and to the throttle control thereof.

A cable rope is adapted to be mounted on each section of the steering drum means 22 and extends to the tiller of the outboard motor for steering the boat to the right or left.

The steering wheel 14 can be easily turned for steering a power boat from a remote position from the outboard motor. The handles 26 and 27 being adjacent to the steering wheel 14 permits quick operation of the throttle control and gear shifting of an outboard motor. A steering and control mechanism of my construction, allows ease of operation of an outboard motor and the operator can always keep his eyes on the path of movement on the water.

The rope cables can be connected to either one end or the other end of each of the movable plugs 46 on the rod members 44 so that the gear shaft 24 may become the throttle shaft and the throttle shaft 30 becomes the gear shaft.

From the above description and disclosure in the drawings, it will be apparent that the present invention comprehends a novel remote steering mechanism and control means for an outboard motor mounted on a boat in the form of an attachment adapted for ready attachment to the boat and outboard motor with all of the controls located within the easy reach of the operator.

It is to be understood that the form of my invention, herewith shown and described, is to be taken as a preferred example of the same, and the various changes in the shape, size and arrangement of the parts may be re- Having thus disclosed the invention, I claim:

1. A steering and control device of the class described comprising in combination a bracket, a steering post extending through the bracket, means mounted on the inner end of the steering post for operating the steering post, steering drum means mounted on the lower end of the steering post, a gear control shaft extending through the bracket, a handle connected to the gear control shaft for operating the gear control shaft, a crank arm secured adjacent the lower end of the gear control shaft, a throttle control shaft extending through the bracket, a handle means connected to the upper end of the throttle control shaft for operating the throttle control shaft, a crank arm secured to the lower end of the throttle control shaft, a support assembly mounted adjacent the lower end of the gear and throttle control shafts, a first means mounted on the support assembly comprising a fixed portion, a first member movably mounted on the first fixed portion, the crank arm for the gear control shaft secured to the first movable member; a second means mounted on the support assembly comprising a second fixed portion, and a second member movably mounted on the second fixed member, the crank arm for the throttle control shaft secured to the second movable member.

2. In a steering and control device of the class described comprising in combination a bracket means, a steering post extending through the bracket, handle means mounted on the upper end of the steering post for operating the steering post, steering drum means mounted on the lower end of the steering post, a gear control shaft extending through the bracket, a handle connected to the upper end of the gear control shaft for operating the gear control shaft, the gear handle being positioned adjacent the steering handle, a crank arm secured adjacent the lower end of the gear control shaft, a throttle control shaft extending through the bracket, a handle connected to the upper end of the throttle control shaft for operating the throttle control shaft, the throttle handle being positioned adjacent the steering handle, a crank arm secured adjacent the lower end of the throttle control shaft, a support assembly mounted adjacent the lower end of the gear and throttle control shafts, a first means movably mounted on the support assembly, the crank arm for the gear control shaft connected to the first movable means and a second means movably mounted on the support assembly, the crank arm for the throttle control shaft connected to the second movable means on the support assembly.

3. In a portable steering and control mechanism for outboard motors adaptable to be readily mounted and demounted to a boat comprising a bracket means, a steering post mounted in the bracket, a steering wheel mounted on the upper end of the steering post, a first control shaft mounted in the bracket, a handle connected to the first control shaft; a second control shaft mounted in the bracket, a handle connected to the second control shaft, a crank being secured to the lower end of the first control shaft, a crank being secured to the lower end of the second control shaft, a support assembly secured to the bracket adjacent the lower ends of the two control shafts, a first fixed means on the support assembly, a first movable member on the first fixed means, the crank for the first control shaft secured to the first movable member, a second fixed means on the support assembly and a second movable member mounted on the second fixed means, the crank for the second control shaft secured to the second movable means.

References Cited in the file of this patent

UNITED STATES PATENTS

| 965,081 | Chase et al. | July 19, 1910 |
| 994,428 | Schmidt | June 6, 1911 |
| 1,537,477 | Levesque | May 12, 1925 |
| 1,891,208 | Scheutz | Dec. 13, 1932 |
| 2,114,165 | Cochran | Apr. 12, 1938 |

FOREIGN PATENTS

| 384,918 | Germany | May 8, 1924 |